O. A. KURT AND S. C. BARTHOLDI.
HANDLE OPENING DISHED LID CONTAINER.
APPLICATION FILED MAR. 8, 1920.
1,361,592. Patented Dec. 7, 1920.
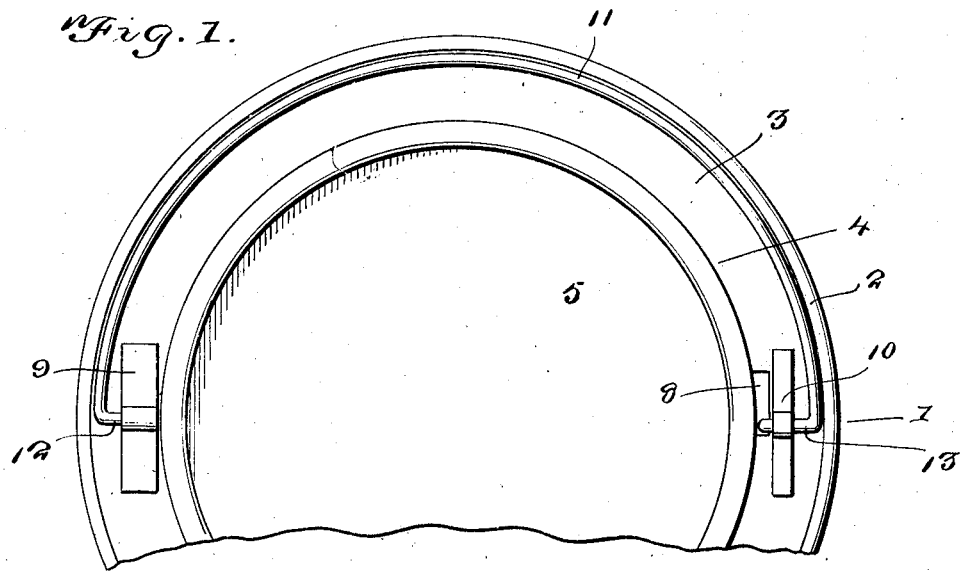
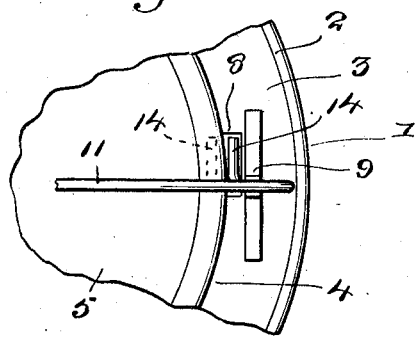
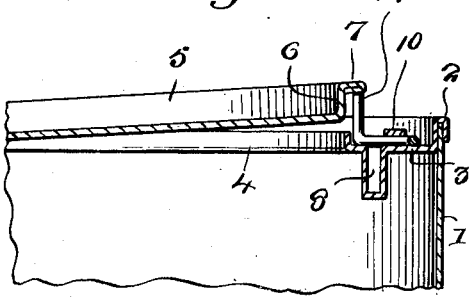
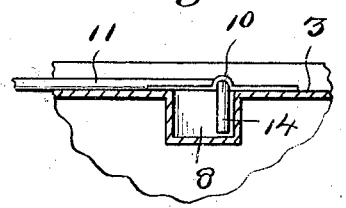
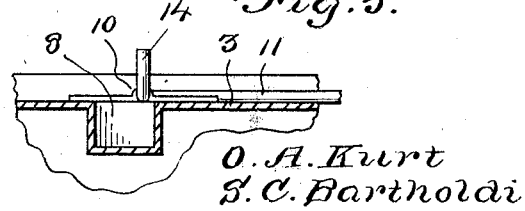
O. A. Kurt
S. C. Bartholdi
INVENTOR
BY Victor J. Evans
ATTORNEY
WITNESS

UNITED STATES PATENT OFFICE.

OTTO A. KURT AND SIMPERT C. BARTHOLDI, OF LOS ANGELES, CALIFORNIA.

HANDLE-OPENING DISHED-LID CONTAINER.

1,361,592.   Specification of Letters Patent.   Patented Dec. 7, 1920.

Application filed March 8, 1920. Serial No. 364,156.

*To all whom it may concern:*

Be it known that we, OTTO A. KURT and SIMPERT S. BARTHOLDI, citizens of the United States, residing at Los Angeles, in the county of Los Angeles and State of California, have invented new and useful Improvements in Handle-Opening Dished-Lid Containers, of which the following is a specification.

Our present invention pertains to the type of dished-lid containers that are equipped with bail-shaped handles and have the handle so constructed and arranged that its opening movement is utilized for the displacement or opening of the lid.

The object of our invention is to improve the type of container defined by the provision of a bail-shaped handle so constructed and arranged relatively to the body of the container and the dished lid that the handle may be swung to open position without affecting the lid, and yet when the handle is moved rectilinearly and diametrically of the container, precedent to the swinging of the handle to its open position, the handle will efficiently displace and open the lid.

To the attainment of the foregoing, the invention consists in the improvement as hereinafter described and definitely claimed.

In the accompanying drawings, hereby made a part hereof:

Figure 1 is a plan view of a container embodying our invention, and with the bail-shaped handle in idle position.

Fig. 2 is a detail plan view showing the handle swung to open position without engaging or affecting the dished and flanged lid.

Fig. 3 is a detail vertical section showing the lid as partly raised through the medium of the handle which is then in position to engage the flange of the lid.

Figs. 4 and 5 are fragmentary views better showing the relative arrangement of the container body, the dished lid, the swinging and rectilinearly adjustable ball-shaped handle and the arm thereon for engaging under the flange of the lid, as well as the pocket in which the said arm is disposed when the handle is in idle position; said views being taken in a plane at the inner side of the arm referred to.

Similar numerals of reference designate corresponding parts in all of the views of the drawings.

The body 1 of the container is provided with an end flange 2 and with an end wall 3 in which latter is an opening 4, spaced from the side wall of the body.

The dished lid 5 for removable disposition in the opening 4 is of the ordinary well known construction, being provided at the upper edge of its side wall 6 with the usual outwardly directed flange 7.

In furtherance of our present invention, the end wall 3 is provided with an elongated pendent pocket 8. The elongation of the said pocket 8 is approximately parallel to the side wall of the body 1, and the pocket is open at its upper end. The said pocket is also disposed in a vertical plane partly within and partly outside the plane of the edge of the flange 7 on the lid 5. In addition to the said pocket 8, the end wall 3 of the body 1 is provided with journal bearings 9 and 10, the bearing 10 being arranged in a plane between that of the pocket 8 and that of the end flange 2.

At 11 is the bail-shaped handle of the container. The said handle 11 is provided with terminal journal portions 12 and 13, the journal portion 12 being disposed and adapted to be turned about its axis in the journal 9, and the journal portion 13 being disposed and similarly movable in the bearing 10. At its inner end the journal portion 13 is provided with an angularly disposed, lid-opening arm 14. When the bail-shaped handle 11 is in its idle position, Fig. 1, the arm 14, which is of a less width than the pocket 8, is disposed in pendent position in the pocket 8, and by reason of the relative arrangement of the said pocket 8 as before described, it will be noted that when the bail-shaped handle is swung straight upward into a perpendicular position, the arm 14 will move idly by the flange 7 of the dished lid 5, and will leave the said lid 5 undisturbed in its usual closed position. When, however, the bail-shaped handle 11 after being slightly raised is moved rectilinearly so as to move the journal portion 13 endwise inwardly and dispose the arm 14 under the flange 7 of the lid, the completion of the movement of the handle 11 to its open position will be attended by raising of the lid 5 through the medium of the arm 14 on the handle.

The capacity of the bail-shaped handle 11 to be moved from its idle nested position in the top of the body 1 to its perpendicular working position either with or without displacing and opening the lid 5, will be appreciated as a practical advantage, when it is stated that in many cases it is desirable to conveniently carry the container for a considerable distance, precedent to the opening of the container. It will also be apparent that we attain the end stated without rendering the construction of the container unduly expensive.

Having described our invention, what we claim and desire to secure by Letters Patent, is:

1. A container comprising a dished lid having an outwardly directed flange on its side wall, a body having an opening in its end wall, spaced from its side wall and in which opening the dished lid is removably arranged and also having on said end wall a pendent pocket open at its upper end and extending partly within and partly without the vertical plane of the outer edge of the lid flange, and further having on said end wall journal bearings, and a bail-shaped handle having terminal portions disposed and movable rectilinearly and about their axes in the said journal bearings and also having on one of said terminal portions an angularly disposed lid-opening arm; said arm occupying the pocket when the handle is in idle position and being adapted to be swung upwardly with the handle without engaging the flange of the lid and being also adapted when moved rectilinearly inward with the handle precedent to the completion of the upward movement thereof to engage the flange of the lid and thereby raise and displace the lid.

2. The combination of a dished and flanged lid, a container body having in its end wall a lid-receiving opening spaced from its side wall and also having on said end wall diametrically opposite journal bearings and in said end wall an elongated opening that extends partly within and partly without the vertical plane of the outer edge of the flange on the lid, and a bail-shaped handle having terminal portions movable rectilinearly and about their axes in said journal bearings and also having on one terminal portion an angularly disposed arm, of a less width than said opening and adapted to engage the flange of the lid.

In testimony whereof we affix our signatures.

OTTO A. KURT.
SIMPERT C. BARTHOLDI.